US010244745B2

(12) United States Patent
Rosier

(10) Patent No.: US 10,244,745 B2
(45) Date of Patent: Apr. 2, 2019

(54) CHUMMING DEVICE

(71) Applicant: Joseph Patrick Rosier, Tampa, FL (US)

(72) Inventor: Joseph Patrick Rosier, Tampa, FL (US)

(*) Notice: Subject to any disclaimer, the term of this patent is extended or adjusted under 35 U.S.C. 154(b) by 0 days.

(21) Appl. No.: 15/784,096

(22) Filed: Oct. 14, 2017

(65) Prior Publication Data

US 2018/0368380 A1 Dec. 27, 2018

Related U.S. Application Data

(60) Provisional application No. 62/524,057, filed on Jun. 23, 2017.

(51) Int. Cl.
*A01K 97/02* (2006.01)

(52) U.S. Cl.
CPC .................... *A01K 97/02* (2013.01)

(58) Field of Classification Search
CPC ...... A01K 97/02; A63B 59/20; A63B 65/122; A63B 65/12
USPC ........... 43/44.99, 4; 473/505, 507, 510, 512, 473/513; 124/5
See application file for complete search history.

(56) References Cited

U.S. PATENT DOCUMENTS

| 1,178,044 | A | * | 4/1916 | Adams | A47J 31/02 220/324 |
| 1,470,521 | A | * | 10/1923 | Combest | A47J 37/1295 206/0.5 |
| 2,531,551 | A | * | 11/1950 | Brecht | A01K 97/05 43/4 |
| 2,614,358 | A | * | 10/1952 | Adams | A01K 97/02 43/43.1 |
| 2,670,557 | A | * | 3/1954 | Pachner | A01K 97/05 209/418 |
| 3,106,419 | A | * | 10/1963 | Estwing | E21C 37/22 294/2 |
| 3,354,575 | A | * | 11/1967 | Darrow | A01K 97/05 294/179 |
| 3,442,544 | A | * | 5/1969 | Saul | A63B 47/02 294/19.2 |

(Continued)

FOREIGN PATENT DOCUMENTS

| FR | 2843451 A1 | * | 2/2004 | ............ A01K 97/02 |
| JP | 7039424 Y2 | * | 9/1995 | |

(Continued)

*Primary Examiner* — Magdalena Topolski
(74) *Attorney, Agent, or Firm* — Inventions International Inc.; Tiffany C. Miller

(57) ABSTRACT

A chumming device for live bait has a shaft with a first end located opposite a second end. A head is connected to the first end of the shaft. The head has a plurality of openings that facilitate water flow while scooping bait from a live well. The head has a lower portion forming a chamber configured to retain the bait. The chamber has a first side wall located opposite a second side wall. The chamber has a lip located opposite a protruding structure. The protruding structure extends beyond the chamber opening and is configured to align the bait to be launched in a direction by the force of a user. A handle is connected to the second end of the shaft. The shaft can have a plurality of bores each have different sized diameters arranged in an ascending diameter. The shaft can have a plurality of shaft openings.

8 Claims, 7 Drawing Sheets

(56) References Cited

U.S. PATENT DOCUMENTS

| | | | | | |
|---|---|---|---|---|---|
| 3,949,510 | A | * | 4/1976 | Johnson | A01K 77/00 43/4 |
| 4,769,939 | A | * | 9/1988 | Gonska | A01K 97/01 294/2 |
| 5,072,538 | A | * | 12/1991 | Hendricks | A01K 97/01 210/470 |
| 5,290,039 | A | * | 3/1994 | Cornelio | A63B 59/20 473/513 |
| D387,514 | S | * | 12/1997 | Savicki | 294/1.3 |
| 6,076,829 | A | * | 6/2000 | Oblack | A63B 59/20 124/5 |
| 6,598,334 | B1 | * | 7/2003 | Edevold | A01K 97/01 294/179 |
| 7,225,584 | B1 | * | 6/2007 | Speidell | A01K 97/02 43/4 |
| 8,028,684 | B1 | * | 10/2011 | Weissmann | F41B 3/03 124/5 |
| 8,327,832 | B2 | * | 12/2012 | Henry | A63H 33/18 124/5 |
| 2007/0199236 | A1 | * | 8/2007 | Brzozowski | A01K 77/00 43/44.99 |
| 2012/0048251 | A1 | * | 3/2012 | Oblack | A01K 15/025 124/5 |
| 2013/0139427 | A1 | * | 6/2013 | Land | A01K 97/00 43/4 |
| 2017/0258047 | A1 | * | 9/2017 | Wills | A01K 15/027 |

FOREIGN PATENT DOCUMENTS

| | | | | |
|---|---|---|---|---|
| JP | 2533787 | Y2 | * | 4/1997 |
| JP | 09294517 | A | * | 11/1997 |
| JP | 2564255 | Y2 | * | 3/1998 |
| JP | 2004305181 | A | * | 11/2004 |
| JP | 3655287 | B2 | * | 6/2005 |
| JP | 2007195442 | A | * | 8/2007 |
| JP | 2008035756 | A | * | 2/2008 |
| KR | 20020025932 | A | * | 4/2002 |
| KR | 20020075726 | A | * | 10/2002 |

* cited by examiner

US 10,244,745 B2

CHUMMING DEVICE

CROSS REFERENCE TO RELATED APPLICATIONS

This application claims priority to U.S. Provisional Patent Application No. 62/524,057, filed Jun. 23, 2017, entitled, "Chumming Device".

BACKGROUND OF THE INVENTION

1. Field of the Invention

This invention relates, generally, to a device used for fishing. More particularly, it relates to a device for distributing chum while, or before, fishing.

2. Background Art

Currently, a variety of devices exist to release chum into water to attract fish. It is well known that chum includes chopped fish or fish fluids for angling fish. These chumming devices include, but are not limited to, bait transfer scoops, mesh pots, net bags, mesh bags, chum launchers, PVC dispensers, fishing bait catapults, baskets, and bait ball launchers. These devices are configured to dispense dead fish pieces, chum, or a luring substance and are not designed to efficiently dispense live bait. Thus, there is a need for a launching device having an improved handle portion and an improved bait retaining portion capable of capturing, retaining, and launching live bait at a length great enough to attract any type of sea life including, but not limited to, a fish or a shark, and being capable of draining excess liquid from the bait retaining portion.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a chumming device for live bait having a shaft with a primary end located opposite a secondary end. A head is connected to the primary end of the shaft. The head has a plurality of openings that facilitate water flow while scooping bait from a live well. The head has a lower portion forming a chamber configured to retain the bait. The chamber has a primary side wall located opposite a secondary side wall. The chamber has a lip located opposite a protruding structure. The protruding structure extends beyond the chamber opening and is configured to align the bait to be launched in a direction by the force of a user. A handle is connected to the secondary end of the shaft. The shaft can have a plurality of bores each have different sized diameters arranged in an ascending diameter. The shaft can have a plurality of shaft openings. The novel chumming device is configured to gather live bait from a live well on a boat or on land and to distribute the live bait in a chumming manner while fishing and is now met by a new, useful, and non-obvious invention.

The following description and drawings are illustrative and are not to be construed as limiting. Numerous specific details are described to provide a thorough understanding. However, in certain instances, well know or conventional details are not described in order to avoid obscuring the description. References to one or an embodiment in the present disclosure are not necessarily references to the same embodiment; and, such references refer to at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

In a preferred embodiment, the novel chumming device is designed to gather live bait from a live well on a boat or on land and to distribute the live bait in a chumming manner while fishing. The chumming device for bait has a head connected to a primary end of a shaft. The head has a plurality of openings, whereby, the head is completely perforated. The plurality of openings of the head is configured to allow water flow while scooping bait from a live well. The head has a top portion being angled, whereby, the top portion of the head is configured to launch bait from the head. The head has a lower portion being a reservoir. The lower portion of the head is configured to retain bait. The lower portion of the head has a lip. The lip extends up from the primary end of the shaft. The chumming device has a shaft having a primary end located opposite a secondary end. The shaft has a slight forward curvature, whereby, the slight forward curvature is configured to launch bait from the lower portion of the head. The chumming device has a handle connected to the secondary end of the shaft. The handle is configured to be gripped by a user.

The novel chumming device can have a handle having a length that is straight in orientation. Although it is a preferred embodiment for the handle to be curved, it is within the scope of this invention for the handle to not have a curve or an angle. The handle can have a diameter configured to be received by a rod holder.

The novel chumming device can have a shaft being made of a flexible material. The flexibility of the shaft is an important feature of this present invention for increasing the launch distance of the bait from the head. However, the material of the shaft cannot be too flexible because the shaft needs to be firm enough for a user to scoop bait from a well without the shaft snapping.

The novel chumming device can have a handle having at least one finger groove or recess located on an outer surface of the handle. The shaft can have a plurality of recesses configured to receive at least a portion of a user's hand when a user is grasping the handle portion of the shaft.

In an alternate embodiment, the novel chumming device has a shaft having a primary end located opposite a secondary end. At least a portion of the shaft has a curvature. A head is connected to the primary end of the shaft. The head has a plurality of openings that are configured to allow water flow while scooping bait from a live well. The head has a top portion configured to launch bait from the head. The head has a lower portion forming a chamber configured to retain bait. The chamber has a primary side wall located opposite a secondary side wall. The primary side wall and the secondary side wall each have a plurality of openings located thereon. The primary side wall has a recess bordering the chamber opening and the secondary side wall has a recess bordering the chamber opening. The chamber has a lip located opposite a protruding structure. The lip and the protruding structure each have a plurality of openings located thereon. The protruding structure extends beyond the chamber opening. The chamber opening has a size great enough to receive bait within the chamber. The bait pass through the chamber opening of the chamber and are retained within the chamber of the head until the bait are launched out of the chamber by the force of a user swinging the chumming device. The protruding structure is configured to align the bait to be launched in a direction by the force of a user. A handle is connected to the secondary end of the shaft.

The novel chumming device has plurality of openings located on the head. It is a preferred embodiment that these openings are rows of vertically oriented slots. Each vertically oriented slot is positioned parallel to a subsequent vertically oriented slot. These rows of slots can be oriented in columns located on the surface of the head of the chumming device.

The novel chumming device can have a handle having at least one finger groove.

The novel chumming device can alternatively have a primary end of the shaft having a plurality of sequentially arranged bores, whereby, said plurality of bores each have different sized diameters. The plurality of bores are arranged in an ascending or descending diameter size. For example, the bore located nearest the handle portion has a diameter that is smaller in size than the subsequent bore nearest to the head of the chumming device. The bore located closest to the head of the chumming device will have a diameter that is larger in size that the bores closest to the handle of the shaft.

The novel chumming device can have a shaft having a primary shaft opening, a secondary shaft opening, and a tertiary shaft opening traversing the length of the shaft. At least a portion of the primary shaft opening overlays a portion of the secondary shaft opening. At least a portion of the tertiary shaft opening overlays a portion of the secondary shaft opening. For example, the definition of overlay refers to the shaft openings orientation, whereby, at least a portion of the shaft openings are located next to each other or parallel to each other. At least a portion of both the primary shaft opening and the tertiary shaft opening are positioned in a parallel orientation to the secondary shaft opening within the shaft. It is within the scope of this invention for the shaft openings to extend through or traverse at least a portion of the length of the handle of the shaft as well as the traverse the length of the shaft.

The handle is integrally formed within the shaft. The handle may have grooves or finger recesses located on the outer surface of the handle. These outer surface grooves may mirror the shape of the shaft openings located throughout the shaft. For example, the secondary shaft opening has a recess positioned parallel to a primary finger recess of the handle. The tertiary shaft opening can have a shape substantially contouring a secondary finger recess of the handle. The shaft openings make the chumming device light in weight, allow for flexibility of the shaft, and eliminate the use of excess material used to form the shaft. Additionally, the configuration of the shaft openings being staggered and traversing the length of the shaft provide the strength needed for the shaft to support the weight of the chamber retaining bait and to withstand the force of a user swinging the novel chumming device to launch the bait from the chamber. The secondary end of the shaft can have an anchoring recess configured to interlock with a rod holder.

It is within the scope of this current invention for the novel chumming device to be fabricated from one piece of material made from any solid, yet slightly flexible material, including but not limited to, plastic, polymer, PVC, or any synthetic material.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
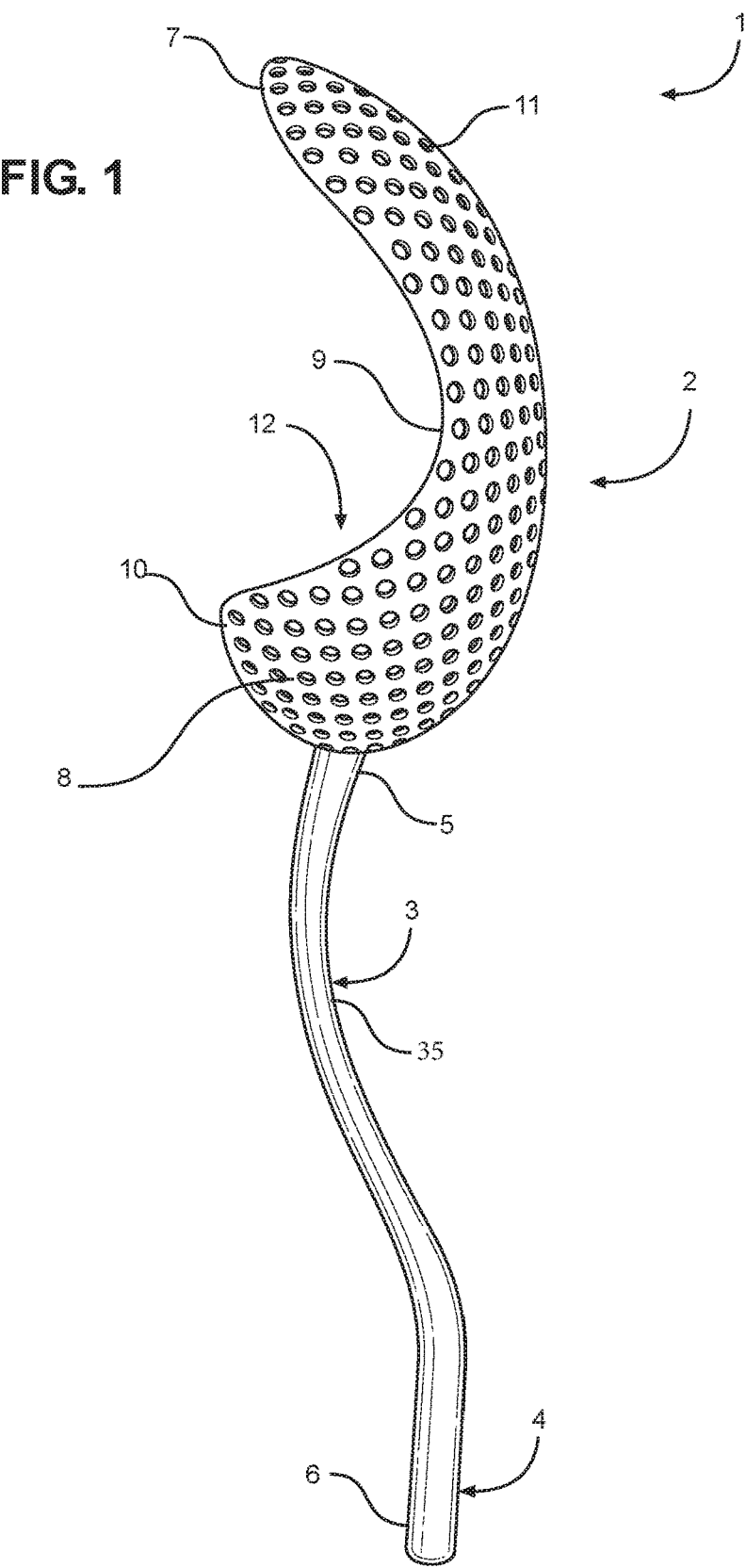
FIG. 1 is a side perspective view of the novel chumming device having a head, a curved shaft, and a handle.
Figure 2:
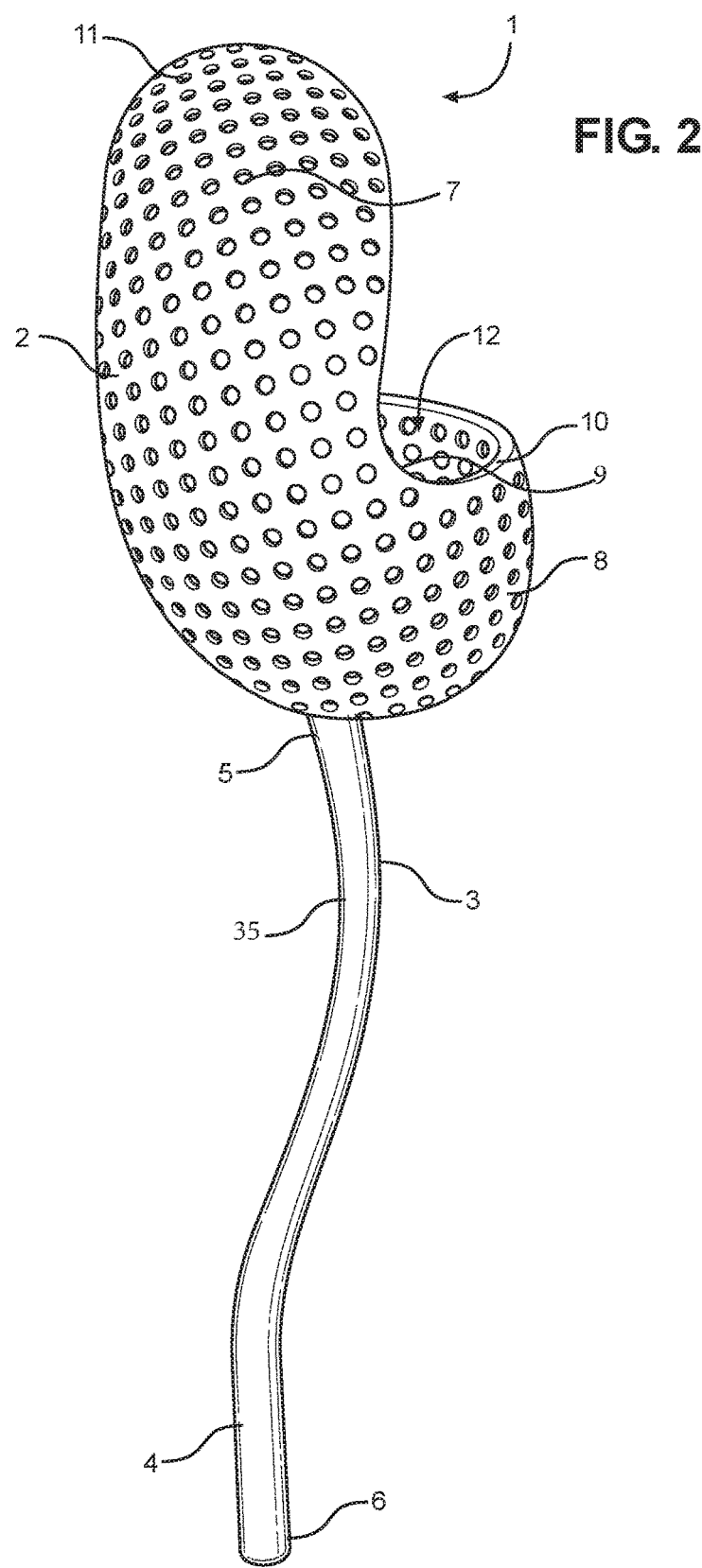
FIG. 2 is a rear perspective view of the novel chumming device having a head, a curved shaft, and a handle.

FIGS. 1 and 2 both illustrate an embodiment of chumming device 1 in accordance with present disclosure. Chumming device 1 has shaft 3 having primary end 5 located opposite secondary end 6. Head 2 is connected to primary end 5 of shaft 3. Head 2 has a top portion 7 and a lower portion 8. Handle 4 is connected to secondary end 6 of shaft 3. Shaft 3 has curvature 35. Head 2 serves as the scoop, reservoir 12, container, and the final launching piece. It is within the scope of this invention for head 2 to include, but not be limited to, a circular or oblong cup shape. In another embodiment, head 2 can be totally perforated 11 to allow water flow while scooping the bait from the live well.

In an embodiment, head 2 of chumming device 1 can be approximately 8-16" in height, approximately 5-10" in width, and approximately 3-8" deep. In another embodiment as best depicted in FIGS. 1 and 2, the depth of head 2 varies at different points. For example, the top portion 7 of head 2 can be angled 9 in a manner to assist in the launching and spreading of bait (not shown) as the bait are flung out of head 2. In yet another embodiment, the lower portion 8 of head 2 is larger in size and serves as a reservoir 12 to hold and contain the bait (not shown) before they are launched. It is within the scope of this current invention for lower portion 8 of head 2 to have lip 10. Lip 10 is configured to retain bait (not shown) in head 2 of chumming device 1 until the bait is launched. In another embodiment, lip 10 will extend approximately 4-6" up from shaft 3.

Figure 3:
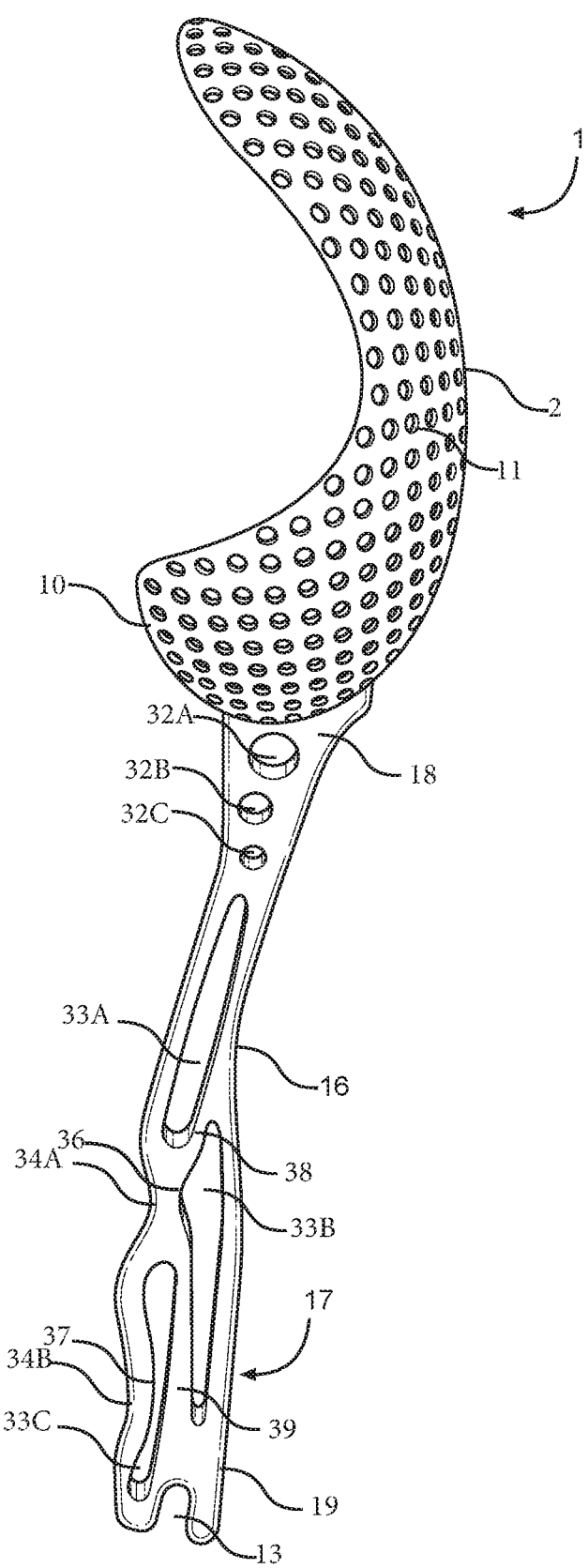
FIG. 3 is side perspective view of an alternative embodiment of the novel chumming device having a handle with finger grooves and shaft openings.

In an embodiment as best shown in FIGS. 1-3, the entire head 2, including lip 10, is perforated 11 as to allow chumming device 1 to flow easily through the water while collecting bait from the well. In an embodiment, perforations 11 are frequent enough to allow the flow of water, but also small enough as to not hinder, block, obstruct, or catch the bait as they are being flung (i.e. a very large amount of very small holes 11).

Shaft 3 of chumming device 1 serves as the lever that initiates, with arm propulsion, the launching of the bait.

In yet another embodiment, shaft 3 is one linear piece with a slight forward curvature 35 (FIGS. 1 and 2) that allows for further launching of the bait through the flexibleness of the material. However, shaft 3 is not so flexible that it hinders, or makes difficult, retrieving bait out of the live well (not shown). In the illustrated embodiments of FIGS. 1 and 2, shaft 3, depending on the model, is approximately 10-36" long.

Handle 4 (FIGS. 1 and 2) serves as the gripping point for chumming device 1 in order to retrieve bait from the live well and to launch the bait in a chumming manner. It is within the scope of this invention for handle 4 to be specially designed to aid in easier storage of the device, as described below.

In an embodiment shown in FIGS. 1 and 2, handle 4 is circular and is designed to fit into standard rod holders mounted on boats, docks, or land. These rod holders vary in size but are usually no larger than 2" in diameter. Therefore, in such embodiments, handle 4 is approximately 1½" in diameter and is approximately 6" in length. In the illustrated embodiments in FIGS. 1 and 2, handle 4 is straight (unlike shaft 3) to allow the device to be stores in a rod holder.

Figure 4:
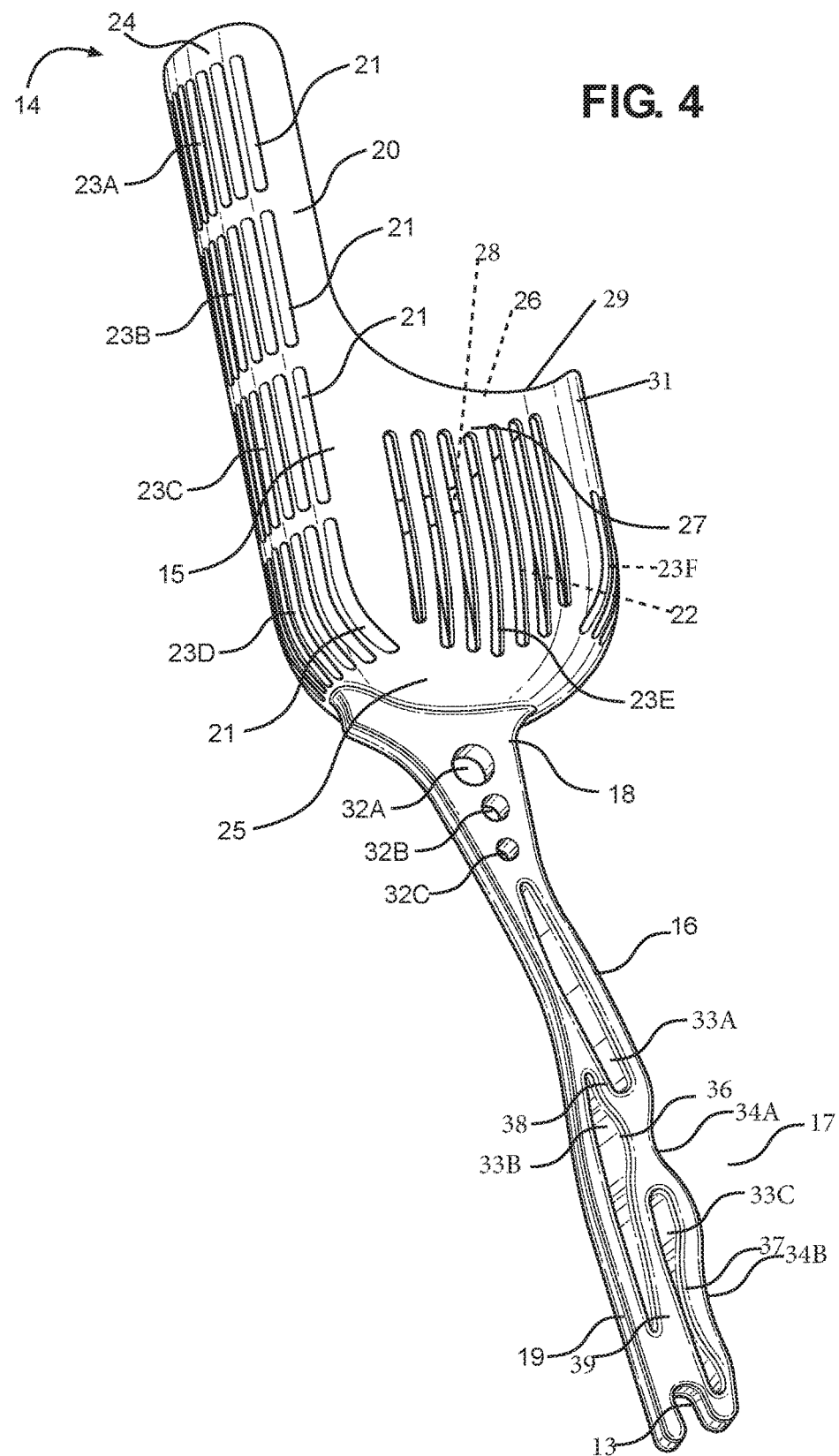
FIG. 4 is a perspective view of an alternate embodiment of the novel chumming device having a head, a shaft, and a handle with finger grooves and shaft openings.

FIG. 3 shows chumming device 1 having head 2 with an alternate embodiment of shaft 16. FIGS. 3 and 4 best illustrate shaft 16. Handle 17 of shaft 16 has slight finger and thumb grooves 13 to allow for better gripping. Shaft 16 has primary end 18 located opposite secondary end 19. Primary end 18 of shaft 16 has a plurality of bores 32A-C. It is a preferred embodiment for the plurality of bores 32A-C to be circular in shape. Opening 32A has a first diameter. Opening 32B has a second diameter. Opening 32C has a third diameter. The first diameter of opening 32A is a length greater than the diameter length of opening 32B and greater than the diameter length of opening 32C. Second diameter of opening 32B is a length greater than the diameter length of opening 32C. The differing sized bores 32A-32C of shaft 16 are positioned through primary end 18 of shaft 16 in an ascending orientation, whereby, the diameter of each bore increases in size traveling toward the head to allow flexibility of the chumming device when launching the bait from the chumming device. For example, FIGS. 3-4 illustrate diameter of bores increasing in size as the bores 32A-C traverse the length of shaft 16 toward the head of the chumming device, whereby, bore 32C is smaller in size and bore 31A is larger in size.

As best shown in FIGS. 3-4, shaft 16 has shaft openings 33A-33C. Shaft openings 33A-33C have a length greater than their width and they traverse at least a portion of the length of shaft 16. A portion of shaft opening 33A overlays 38 at least a portion of shaft opening 33B. At least a portion of shaft opening 33C overlays 39 at least a portion of shaft opening 33B. Shaft openings 33A-33C allow flexibility of shaft 16 when a user launches bait. Also, the orientation of shaft openings 33A-33C helps in the structural sturdiness of shaft 16, allowing flexibility without causing strain and breakage of shaft 16.

Figure 5:
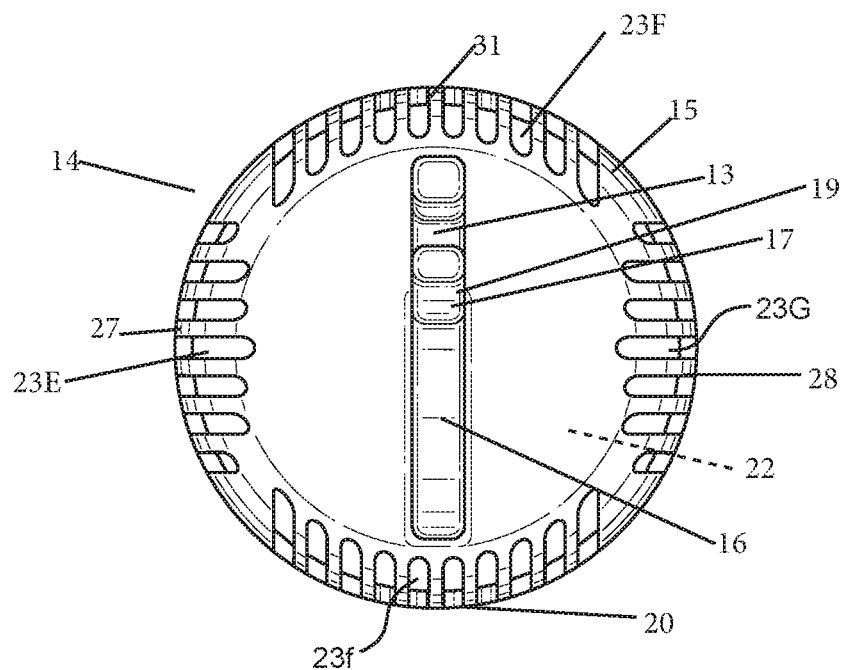
FIG. 5 is a bottom view of an alternate embodiment of the novel chumming device having a handle portion having an anchoring recess located thereon.

Many rod holders have a small circular piece located at the bottom which allows a rod to interlock with to prevent movement. Handle 17 has anchoring recess 13 (FIGS. 3-5) located on secondary end 19 of handle 17. Anchoring recess 13 of handle 17 is configured to fit into the bottom portion of a rod holder to prevent movement of the chumming device.

FIGS. 3-4 best depict handle 17 having finger recesses 34A and 34B. Finger recesses 34A and 34B are located on the outer surface of handle 17. Finger recesses 34A and 34B may mirror or be oriented in a location opposing the shape of any of the shaft openings 33A-C located throughout shaft 16. Secondary shaft opening 33B has a recess 36 in a position opposing primary finger recess 34A of handle 17. Tertiary shaft opening 33C can has a recess 37 substantially contouring secondary finger recess 34B of handle 17.

Figure 7:
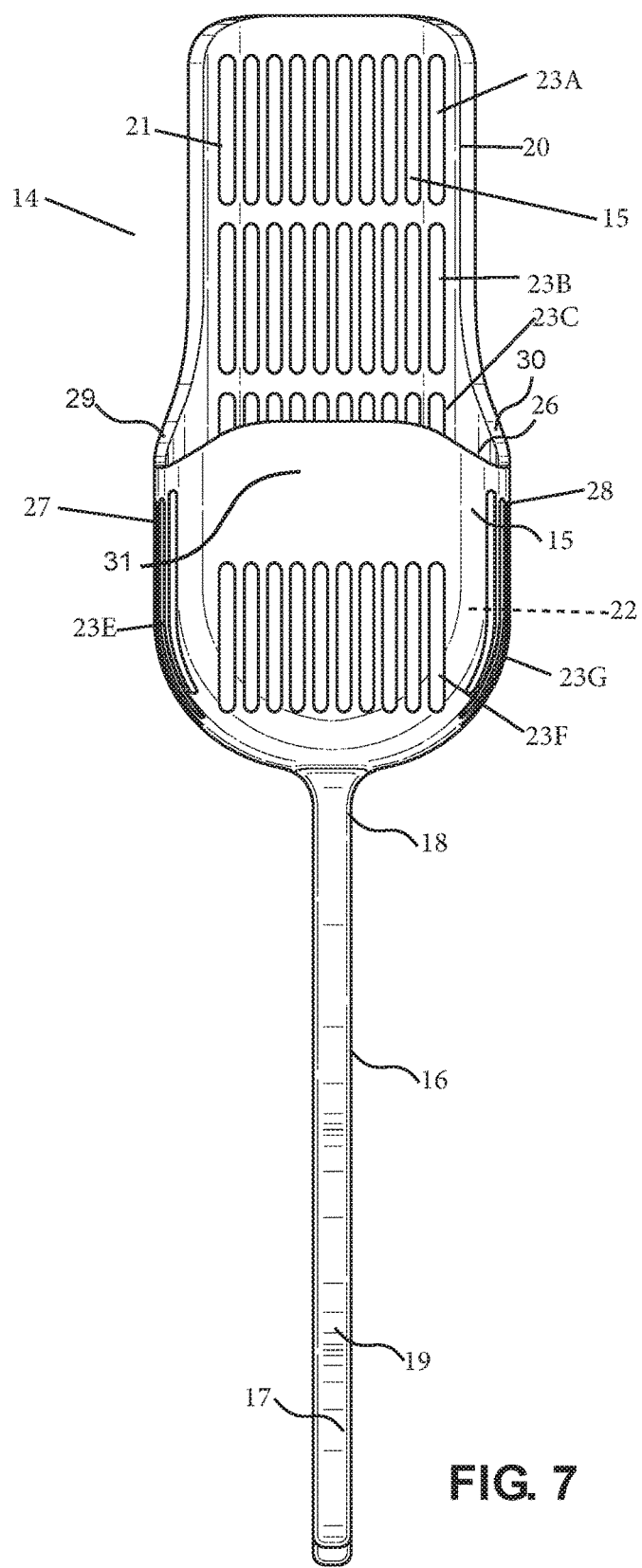
FIG. 7 is a front view of an alternate embodiment of the novel chumming device having a head with a protruding structure and a lip; and, FIG. 8 is a rear view of an alternate embodiment of the novel chumming device having a head having a protruding structure with a plurality of vertically oriented slots.
Figure 8:
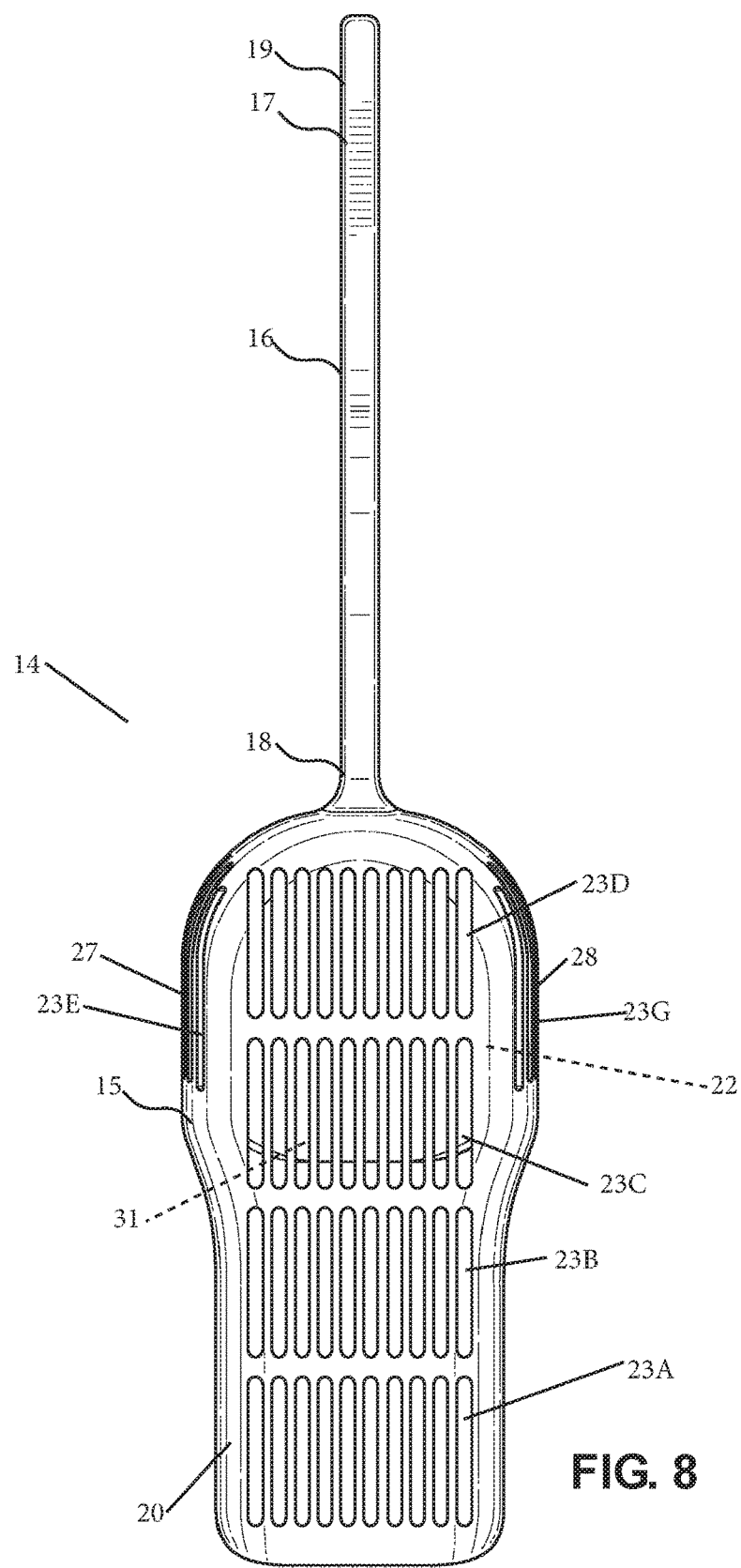

FIGS. 4, 7, and 8 illustrate an alternate embodiment of chumming device 14 having shaft 16 having primary end 18 located opposite secondary end 19. Head 15 is connected to primary end 18 of shaft 16. Head 15 is configured to scoop bait from live bait well.

Figure 6:
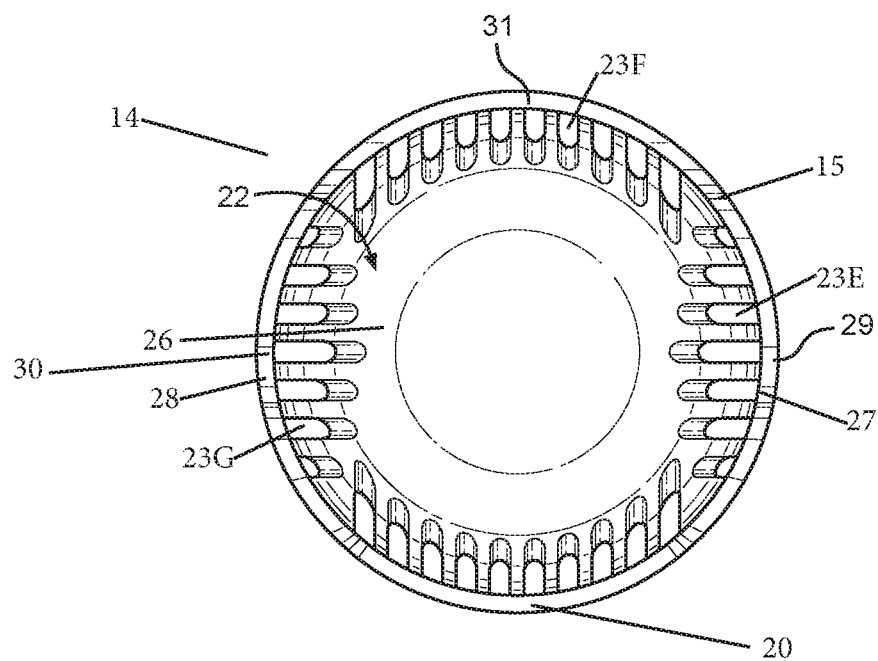
FIG. 6 is a top view of an alternate embodiment of the novel chumming device having a head having a chamber with a plurality of slotted openings.

As best shown in FIGS. 4, 6, and 7 head 15 has chamber 22 configured to retain live bait. Water can flow out of chamber 22 through a plurality of vertically oriented slots 23A-G. Chamber 22 has chamber opening 26 configured to receive including, but not limited to, bait, live bait, or chum. The bait is retained within chamber 22 until the bait is launched from chamber 22 by the force of a user.

FIGS. 4-8 illustrate chamber 22 of head 15 having primary side wall 27 located opposite secondary side wall 28. FIGS. 4 and 6 illustrate primary side wall 27 having recess 29. FIGS. 4-8 show primary side wall 27 having row 23E of plurality of vertically oriented slots 21. FIG. 6 best shows secondary side wall 28 having recess 30 and row 23G of plurality of vertically oriented slots 21. FIGS. 5-8 show secondary side wall 28 having row 23G of plurality of vertically oriented slots 21. Chamber 22 of head 15 has lip 31 located opposite protruding structure 20. FIGS. 4, 5, 6, and 7 show lip 31 having row 23F of plurality of vertically oriented slots 21.

FIGS. 4-8 further illustrate an alternate embodiment of chumming device 14 having head 15 with protruding structure 20. Head 15 and protruding structure 20 have a plurality of vertically oriented slots 21 positioned parallel to each other. It is within the scope of this invention for a vertically oriented slot 21 to be defined as an opening having a height greater than its width. There are rows 23A-G of a plurality of vertically oriented slots 21. Row 23A and row 23B are located at the top portion 24 (FIG. 4) of protruding structure 20. Row 23C and row 23D are located at lower portion 25 (FIG. 4) of head 15.

FIGS. 4-5 and 7-8 depict an alternate embodiment of chumming device 14 having handle 17 being connected to secondary end 19 of shaft 16.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

The invention claimed is:

1. A chumming device for bait, comprising:
   a shaft, said shaft having a first end located opposite a second end, said shaft having a curvature, said first end of said shaft having a plurality of bores, said plurality of bores each have different sized diameters, said plurality of bores are arranged in an ascending diameter size from said first end of said shaft toward said head, whereby, the diameter of each bore increases in size traveling toward the head and is configured to allow flexibility of said chumming device when launching bait from said chumming device, a first bore has a first diameter length, a second bore has a second diameter length, a third bore has a third diameter length, said first diameter length of said first bore is a length greater than said second diameter length of said second bore, said second diameter length of said second bore is a length greater than said third diameter length of said third bore;
   a head, said head is connected to said first end of said shaft, said head having a plurality of openings, said plurality of openings are configured to allow water flow while scooping bait from a live well, said head having a top portion, said top portion is configured to launch said bait from said head, said head having a lower portion, said lower portion of said head forming a chamber, said chamber having a chamber opening, said chamber opening having a size great enough to receive said bait, said chamber is configured to retain said bait;
   said chamber having a first side wall located opposite a second side wall, said first side wall and said second side wall having said plurality of openings located thereon, said first side wall of said chamber having a first recess bordering said chamber opening and said second side wall of said chamber having a second recess bordering said chamber opening, said chamber having a lip located opposite a protruding structure, said lip and said protruding structure having said plurality of openings located thereon, said lip extends up from said first end of said shaft, said lip is located between said recess of said first sidewall and said recess of said second sidewall, said lip extends beyond said recess of said first sidewall and said recess of said second sidewall, said lip does not extend beyond an end of said protruding structure, said protruding structure extending beyond said chamber, said protruding structure is configured to align said bait to be launched in a direction by a force of a user; and,
   a handle, said handle is connected to said second end of said shaft, said secondary end of said shaft having an anchoring recess located in an opposite direction of said chamber opening, said anchoring recess is located on an end of said handle, said anchoring recess is configured to interlock with a rod holder.

2. The chumming device of claim 1, further comprising said plurality of openings are positioned in rows of vertically oriented slots.

3. The chumming device of claim 2, further comprising said vertically oriented slots are positioned parallel to each other.

4. The chumming device of claim 1, further comprising said handle having at least one finger groove.

5. The chumming device of claim 1, further comprising said shaft having a first shaft opening, a second shaft opening, and a third shaft opening traversing the length of said shaft, at least a portion of said first shaft opening overlays a portion of said second shaft opening, at least a portion of said third shaft opening overlays a portion of said second shaft opening.

6. The chumming device of claim 5, further comprising said second shaft opening having a recess positioned parallel to a first finger recess of said handle.

7. The chumming device of claim 5, further comprising said third shaft opening having a shape substantially contouring a second finger recess of said handle.

8. The chumming device of claim 1, further comprising said shaft being made of a flexible material.

* * * * *